July 3, 1962
H. CYPHERT
3,042,231
DEVICE FOR UNLOADING CYLINDRICAL OBJECTS
Filed March 2, 1959
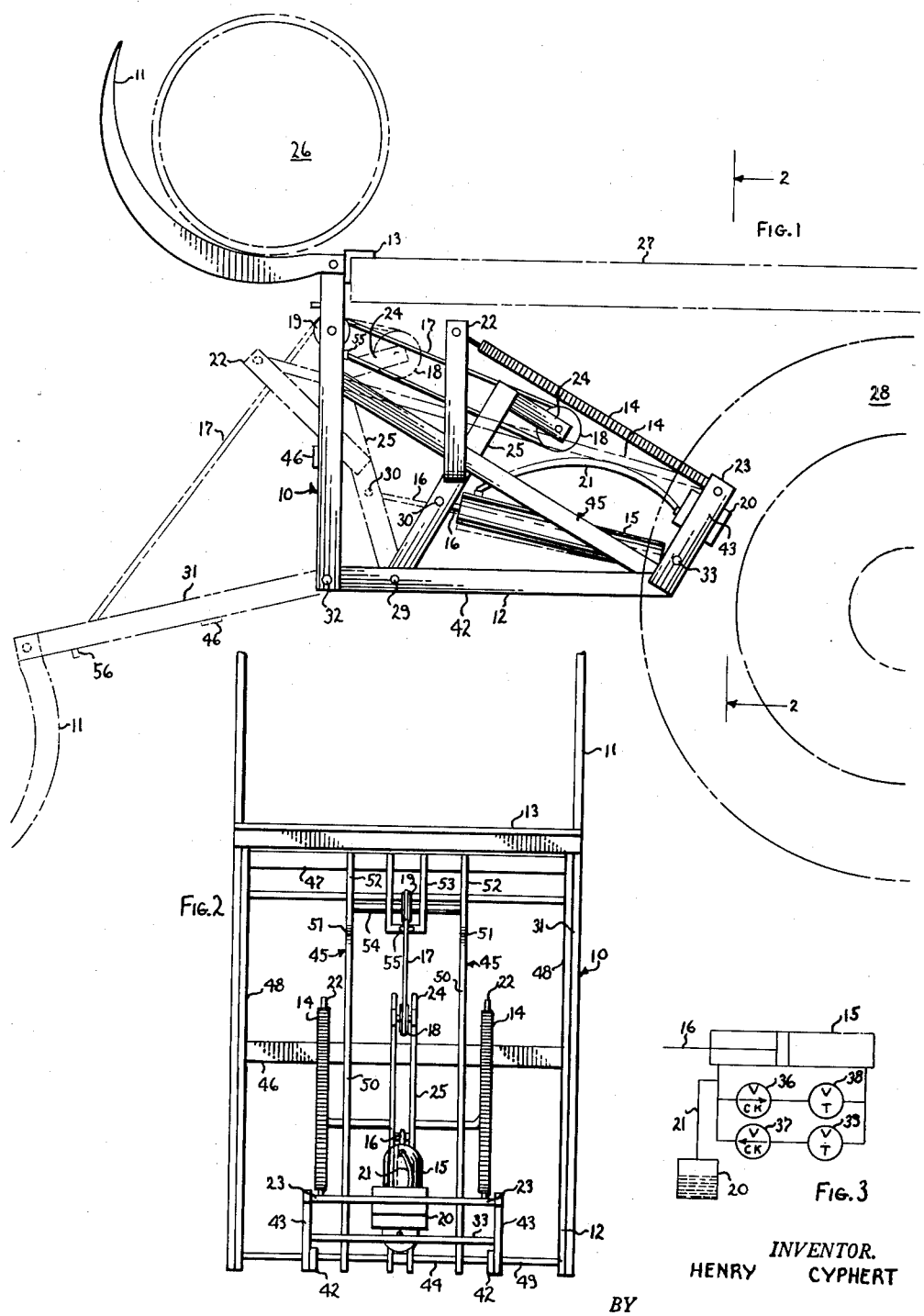
INVENTOR.
HENRY CYPHERT
BY
Charles L. Lorenchek
ATTORNEY United States Patent Office 3,042,231
Patented July 3, 1962

3,042,231
DEVICE FOR UNLOADING CYLINDRICAL OBJECTS
Henry Cyphert, R.D. 2, Clarion, Pa.
Filed Mar. 2, 1959, Ser. No. 796,303
5 Claims. (Cl. 214—77)

This invention relates to barrel unloaders and, more particularly, to gravity actuated unloading devices.

In the invention disclosed herein, an automatic barrel unloader is shown which is light in weight, compact in structure, and requires little or no maintenance. The device needs no further attention than to place a drum from a vehicle onto the cradle. The drum will be automatically unloaded. After the drum is removed from the cradle, the self-retracting cradle will return to the loading position ready to receive another drum.

It is, accordingly, an object of this invention to provide an unloading device which is simple in construction, economical to manufacture, and simple and efficient in operation.

Another object of the invention is to provide an automatic unloading device which is compact and light in weight.

Still another object of the invention is to provide an unloader which, when the cradle is lowered, provides that the cradle automatically assumes a tilted position, allowing the load to roll off of the cradle at the unloading position.

Yet another object of the invention is to provide a cradle in an unloading device which has means to automatically control the return of the cradle to the loading position.

It is another object of the invention to provide means to control the speed of the downward and upward travel of a cradle in an automatic unloading device.

A further object of the invention is to provide means to adjust the rate of lowering of an object in an unloading device so as to lower objects of various weights, the adjusting means comprising a cylinder with a throttle valve.

A still further object of the invention is to provide a device which may be easily mounted to the rear or sides of a truck bed or body of a vehicle.

Yet a further object of this invention is to provide an unloader which is completely concealed under a truck bed.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view of a device according to the invention mounted on a truck bed with phantom lines indicating the truck and, also, the device in its unloading position;

FIG. 2 is a view taken on line 2—2 of FIG. 1 and drawn to a different scale; and FIG. 3 is a schematic view of the cylinder and its control circuit according to the invention.

Now with more particular reference to the drawing, an automatic barrel unloader 10 is shown having a fixed frame 31. The frame 31 is made up essentially of two laterally spaced, restrained three bar linkages rigidly connected together and made up of horizontally disposed arms 42, front vertically disposed frame members 48, and upwardly and forwardly inclined frame members 45. The frame members 45 have a rear portion 50 which extends forwardly and upwardly at an angle of approximately thirty degrees and terminates at 51 at an upwardly extending portion 52.

The upper ends of the portions 52 and the upper ends of the vertically extending frame members 48 are fixed to an upper transverse bar 47. The lower ends of the vertically extending members 48 and the front ends of the arms 42 are fixed to a lower transverse bar 49. The rear ends of the arms 42 and the rear ends of the frame members 45 are fixed to a rear transverse bar 44. Spring support arms 43 are fixed to the rear ends of the arms 42.

A U-shaped bracket 53 has the ends of its legs fixed to the transverse bar 47 and a pulley 19 is supported between the legs of the bracket 53 by an axle 54 which has its terminal ends fixed to the portions 52. A cable 17 has its dead end fixed to the U-shaped bracket 53 by means of an eye bolt 55. The cable 17 passes from the dead end around a pulley 18, then over the pulley 19, and is attached to an arm 12 at 56. The pulley 18 is pivoted between pulley supports 24 which are, in turn, fixed to a lever 25. The lever 25 is swingably attached to the arms 42 at 29. Since the pulley 18 is supported between the dead end and the live end, it will move only half as fast as the point 56. Therefore, springs 14 may be stretched less than if they were attached directly to the arm 12.

A cradle 11 and the cradle arms 12 are pivotally attached to the frame 31 at 32. A brace 46 is attached to the arms 12 at its ends which engage links 48 when it is in its upper position. A control cylinder 15 is attached to the lever 25 by a piston rod 16 at 30 and pivotally attached to the spring support arms 43 at 33. The return spring 14 is attached to a spring support 23 and a spring arm 22. The spring arm 22 extends downwardly and then inwardly and is welded to the lever 25 and moves with the lever 25 from the full line position to the phantom position, extending the spring 14 as shown.

A mounting plate 13 is attached to the side of a truck or, as shown in this application, to the rear end at the corner of a truck bed 27 between wheels 28. Therefore, the cradle 11 and the arm 12 attached thereto may swing from the position shown to the phantom line position.

A barrel 25 may be rolled from the truck bed 27 onto the cradle 11. When the cradle 11 has received the barrel 26, the cradle arm 12 is forced slowly downwardly to the phantom line position against the force of the springs 14 are restrained by the cylinder 15 to the unloading position. The adjustments made on valves 38 and 39 control the cylinder 15. When the barrel 26 rolls off of the cradle 11, the springs 14 will return the cradle arm 12 to the position shown in full lines. When the barrel 26 is unloaded from the cradle 11, the cradle 11 will swing upwardly forced by the springs 14. The cylinder 15 will act as a restraining device to cause the arm 12 to swing to its full line position in a slow, smooth upward motion. Thus, the automatic cradle return is obtained which is a very important safety feature.

The speed by which the cradle 11 descends and ascends is controlled by the throttle valve 38 and 39 in series with two check valves attached to the control cylinder 15 which has oil therein on either side of the piston. By regulating the throttle valves 38 and 39 so that a given amount of fluid passes from one side of the piston to the other, a fixed speed can be obtained. Check valves 36 and 37 control the direction of flow so that one throttle valve controls the rate of rise and the other controls the rate of descent.

A reservoir tank 20 with a connecting oil line 21 receives the excess fluid which is displaced in the cylinder 15 when the piston rod 16 is in retracted position moving out of the cylinder 15.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A device for lowering objects comprising a rigid frame, means on said frame to attach it to a platform adjacent the edge thereof with said frame extending downwardly from said platform, a cradle arm swingably attached to said frame at one end, a second arm swingably attached to said frame at one end and having a pulley on the other end, means on the other end of said cradle arm to receive a said object, a cable attached to said cradle arm at one end, another part of said cable being connetced to said frame and passing around said pulley, a spring, said spring being connected to said frame at one end and to said second arm at the other end, said spring urging said cradle arm to swing up to bring said means on said cradle arm above the level of said platform, and means to limit the movement of said arm downward when a said object is supported thereon and to limit the movement of said arm to a position with said means on said cradle arm above said platform.

2. The device recited in claim 1 wherein said means to limit the movement of said arm comprises a hydraulic cylinder and a check valve means connected thereto.

3. The device recited in claim 2 wherein said cylinder is a double acting cylinder, a bypass circuit is provided for said double acting cylinder to conduct fluid from one side of the piston therein to the other, and means is provided in said circiut to regulate the flow of fluid in each direction individually.

4. A device for lowering objects comprising a rigid frame, means on said frame to attach it to a platform adjacent the edge thereof with said frame extending downwardly from said platform, a cradle arm swingably attached to said frame at one end, means on the other end of said cradle arm to receive a said object, a cable attached to said cradle arm at one end, a lever swingably attached to said frame at one end, the other end of said lever having a pulley thereon, said cable passing around said pulley and being connected at its other end to said frame a spring connected to said lever at one end and to said frame at the other end, said spring urging said lever to swing away from said cradle arm to pull said cable and thereby swing said cradle arm to a vertical position, a curved cradle attached to said cradle arm at its distal end, said cradle being adapted to receive objects from said platform, said objects forcing said cradle arm to swing downward against the tension of said spring, a cylinder connected to said frame at one end, a double acting piston in said cylinder, said piston being connected to said lever, and means to control the rate of flow of fluid from one side of said piston to the other to limit the rate of movement of said lever.

5. The device recited in claim 4 wherein an outwardly and upwardly extending spring arm is connected to said lever at one end and extends upwardly therefrom, said spring being connected to said spring arm and thereby to said lever.

References Cited in the file of this patent
UNITED STATES PATENTS

| | | |
|---|---|---|
| 2,189,212 | Ljungkull | Feb. 6, 1940 |
| 2,542,047 | Mullin | Feb. 20, 1951 |
| 2,670,861 | Fondriest et al. | Mar. 2, 1954 |
| 2,703,656 | Banks | Mar. 8, 1955 |